United States Patent [19]

Jasperse et al.

[11] 4,010,987
[45] Mar. 8, 1977

[54] REMOVABLE SEAL FOR BEARINGS

[75] Inventors: Philip D. Jasperse, Zeeland; Jerry L. Redmann, Jr., Sparta, both of Mich.

[73] Assignee: C. L. Frost & Son, Inc., Grand Rapids, Mich.

[22] Filed: Oct. 23, 1975

[21] Appl. No.: 625,110

[52] U.S. Cl. ............................ 308/187; 308/187.1; 308/193; 308/208
[51] Int. Cl.² .......................................... F16C 1/24
[58] Field of Search ........ 308/187, 193, 195, 187.1

[56] References Cited
UNITED STATES PATENTS

| | | | |
|---|---|---|---|
| 352,739 | 11/1896 | Daniel | 308/208 |
| 1,503,920 | 8/1924 | Schneebeli | 308/202 |
| 1,737,036 | 11/1929 | Wego | 308/202 |
| 1,798,139 | 3/1931 | Boland | 308/187 |
| 1,817,867 | 8/1931 | Bailey | 308/187 |
| 2,387,602 | 10/1945 | Murden | 308/187 |
| 2,897,022 | 9/1957 | Marola | 308/208 |
| 3,553,765 | 1/1971 | Frost | 308/202 X |
| 3,899,226 | 8/1975 | Frost | 308/187.1 |

*Primary Examiner*—Joseph F. Peters
*Assistant Examiner*—Richard A. Bertsch
*Attorney, Agent, or Firm*—Price, Heneveld, Huizenga & Cooper

[57] ABSTRACT

The specification discloses a bearing assembly including a removable shield which prevents the entry of dirt and other contaminants into the space between the bearing races and yet allows easy maintenance and inspection access to the bearing interior when desired. A grease fitting is provided through the shield and held in a predetermined position for access by automatic relubrication equipment by the cooperation of a noncircular aperture in said shield received over a noncircular shield support at the side of the inner race. Preferably, the shield is held on the shield support by a resilient, split retaining ring received adjacent the shield in a groove in the shield support.

24 Claims, 8 Drawing Figures

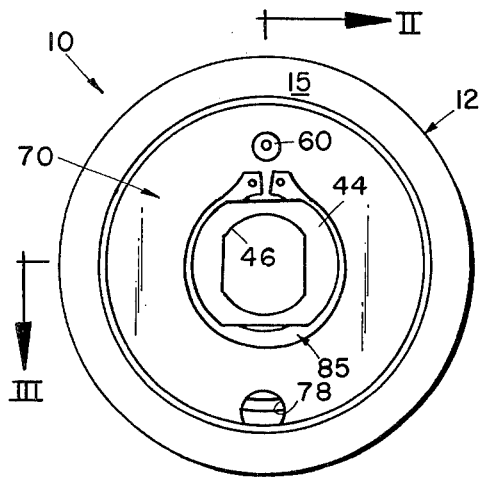
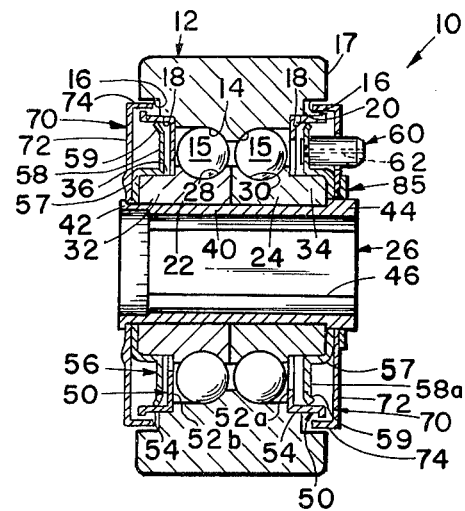

REMOVABLE SEAL FOR BEARINGS

BACKGROUND OF THE INVENTION

This invention relates to bearing assemblies, and, more particularly, to a bearing assembly including a removable shield or seal which protects the assembly from dirt and other contaminants, maintains a grease fitting in a predetermined position, and yet is easily removable for inspection and maintenance of the bearing interior.

It is well known to utilize a cover or guard to prevent dirt and other contaminants from entering a bearing assembly between the inner and outer races thereof. Typically, such covers or guards are permanently fixed in place adjacent the side of the assembly on a support shaft or other structure. In certain applications, especially where the bearing assemblies are subjected to dirt, water, or other high wear, severe operating conditions, it is desirable to remove the cover or guard for inspection of the bearing assembly interior and/or maintenance of the assembly. The prior known structures have required significant disassembly for such inspection and, in many instances, portions of the assembly must be permanently deformed or destroyed to accomplish the disassembly.

Another problem with prior known bearing assemblies has been the inability to facilitate use of such assemblies with automatic relubrication apparatus. Automatic relubrication equipment is typically used along various types of conveyors including overhead trolley conveyors or floor level conveyors and includes a grease gun or other grease insertion equipment mounted adjacent the conveyor for inserting grease in each bearing assembly as it passes by the grease insertion station. While it is generally known to utilize grease fittings on bearing assemblies such that grease may be inserted in each bearing assembly, a recurrent problem has been the inability to properly locate such grease fittings at a common position with respect to automatic relubrication equipment. Thus, the grease fittings were either out of alignment with the equipment and had to be physically located or the assemblies required manual relubrication which, of course, is much more time consuming and expensive.

SUMMARY OF THE INVENTION

Accordingly, the present invention provides a bearing assembly including a removable shield supported adjacent at least one side of a bearing assembly having inner and outer races with antifriction bearing means interposed therebetween. The shield prevents dirt and other contaminants from entering the area between the races and thereby extends the useful life of the assembly.

In other aspects, removable, resilient securing means are provided for quickly removing the shield from the assemblies for inspection and maintenance of the bearing interior. This structure allows removal of the shield without disassembly of any other portion of the assembly and without removing the assembly from its support shaft. Further, the shield may include a grease fitting extending therethrough for insertion of grease to the interior of the assembly. In such case, the shield and shield support means adjacent the inner race of the assembly cooperate to prevent rotation of the shield and grease fitting whereby the grease fitting is maintained in a predetermined position at all times with respect to the shield support. Such positioning enables use of automatic relubrication equipment which must contact each successive bearing assembly in a conveyor at the same location.

In one form, shield support means extend laterally to one side of the inner race and provide a noncircular surface for mounting the shield means which covers the opening between the races. The shield means includes an aperture therethrough with a noncircular cross section matching that of the shield support means as well as greasing means for admitting grease to the interior of the assembly which are positioned in a predetermined position on the shield means. The noncircular cross-sectional shapes of the shield means and shield support means prevent rotation of the shield means with respect to the shield support and maintain the greasing means at the same position with respect to the shield support means at all times.

In another form, an extension is included extending laterally to one side of the inner race with the shield means mounted thereon. Removable securing means are provided for retaining the shield means on the extension including resilient retaining means for constantly maintaining engagement with the extension to hold such shield on the extension and yet allowing removal of the shield means and retaining means without disassembly of any other portion of the assembly.

These and other objects, advantages, purposes, and features of the invention will become more apparent from a study of the following description taken in conjunction with the drawings.

BRIEF DESCRIPTION OF THE DRAWINGS

FIG. 1 is a side elevation of the bearing assembly of the present invention;

FIG. 2 is a sectional end elevation of the bearing assembly taken along plane II—II of FIG. 1;

FIG. 3 is a sectional plan view of the bearing assembly taken at right angles to the view in FIG. 2 along plane III—III of FIG. 1;

FIG. 4 is a perspective exploded view of the bearing assembly with the middle seal, outer shield, and resilient, split retaining ring shown exploded from the assembly;

FIG. 5 is an enlarged, fragmentary, sectional view of the retaining ring and shield support area V in FIG. 3;

FIG. 6 is a perspective view of another embodiment of the split retaining ring which may be used with the present invention comprising a convex, split, resilient retaining ring;

FIG. 7 is a sectional view of the alternate split retaining ring taken along plane VII—VII of FIG. 6; and FIG. 8 is an enlarged, fragmentary, sectional view of the retaining ring and shield support area similar to FIG. 5 but using the convex split retaining ring shown in FIGS. 6 and 7.

DESCRIPTION OF THE PREFERRED EMBODIMENTS

Referring now to the drawings in greater detail, FIG. 1 illustrates the preferred form 10 of the bearing assembly of the present invention. Bearing assembly 10 is a heavy duty bearing assembly designed for use in transporting work pieces along a predetermined path such as in assembly lines. Typically, a movable platform is provided with four or more of the bearing assemblies of the type described herein, one at each platform corner, with the inner shaft or hub of the assembly mounted on an axle or support shaft for the movable platform and the outer races of the assembly providing support wheels traveling along rails or another predetermined pathway on a floor for the platform. As mentioned above, as the platform including a plurality of such bearing assemblies moves past automatic relubrication equipment, the grease fitting provided through the removable shield is maintained in a predetermined position for relubrication by such equipment. Yet, when desired, the shield or seal can be easily removed for inspection of the bearing interior.

As shown in FIGS. 1–4, each bearing assembly includes an annular outer race 12 including a pair of axially spaced, arcuate outer raceways 14, each having a contour matching that of a portion of a spherical ball bearing 15 to be fitted therein. Each lateral side 17 of the outer race is provided with a pair of successively deeper, annular recesses 16, 18 which define an annular, axially extending shoulder 20 recessed behind the plane of the outer side surface 17.

Spaced radially inwardly from the outer race 12 are a pair of inner race members 22, 24 each telescoped over and mounted in abutting relationship to one another on a hollow shaft or hub 26. Inner race members 22, 24 include annular, arcuate inner raceways 28, 30, respectively, each having a cross-sectional shape matching a portion of the circumference of a spherical ball bearing 15. Each of the inner race members includes an annular lateral extension 32, 34, respectively, extending axially outwardly of the assembly and providing an annular, axial surface 36, 38 respectively, generally facing the outer race 12.

Hub 26 includes a generally cylindrical central portion 40 on which are mounted inner race members 22, 24 which have matching inner diameters providing a telescoping slip fit with the hub. At one end, the central portion 40 is turned radially outwardly in an annular flange 42 retaining the apparatus together at one side of the bearing assembly. At the other end, the hub is provided with a shield support portion 44 as will be described hereinafter.

Hub 26 is hollow and includes a bore 46 therethrough having a noncircular cross-sectional shape such that the assembly may be mounted on a correspondingly shaped support axle or shaft and restrained against rotation with respect to that axle or shaft. While a removable seal or shield is shown on support portion 44 on only one side of the assembly in the preferred embodiment, it is well within the scope of the invention to provide removable seals on both sides of the assembly. Normally, however, two removable seals will not be necessary since maintenance and inspection can be accomplished from one side of the assembly.

As seen in FIGS. 2 and 3, on either side of the assembly a series of three sealing rings, seals, and shields are provided both to hold grease within the bearing assembly and to prevent the entry of contaminants such as dirt, grit, and other foreign particles to the interior of the assembly. Included are inner sealing rings 50, middle seals 56, and outer shields 70.

In the innermost position immediately adjacent either row of ball bearings 15, are annular inner sealing rings 50 including an annular, radially extending, generally planar flange 52 and an axially extending, annular flange 54 extending outwardly of the assembly. The corner between flanges 52, 54 is press fitted against axial shoulder 20 in recess 18 of the outer race. Radial flange 52 extends toward the inner race but ends short of the inner race on either side of the assembly. Flange 52a on the right side of the assembly (FIGS. 2 and 3) ends approximately one-third of the distance between the inner and outer races to provide a larger annular space adjacent the right-hand row of ball bearings for admitting grease to the bearings on the side including the grease fitting 60. Radial flange 52b on the assembly side opposite the grease fitting is longer than flange 52a but still does not engage the inner race. Because of these annular spaces between the inner race members and the end of the radial flanges 52, no part of the inner sealing ring contacts the inner race during rotation of the outer race.

Intermediate the inner sealing rings 50 and the outer rigid shields 70 are seals 56 preferably having a rigid central portion 57 stamped from steel and an outer, annular lip 59 molded from rubber or plastic such as black nitrile rubber. Central area 57 is offset and contoured to match the contour of lateral extensions 32, 34 and engaging axial surfaces 36, 38 of the inner race members 22, 24. Central portion 57 also includes a radially extending flange 58 on which is bonded the molded angled sealing lip 59 (FIG. 5). The material of lip 59 can extend completely over the outer face of seal 56 (FIGS. 5 and 8) or can be stopped at the end edge of the radial flange of rigid central area 57. In the middle of the steel portion of radial flange 58a on the right-hand seal member 56 as shown in FIG. 2, is secured by staking or the like a conventional cylindrical grease fitting 60. Fitting 60 includes a central passageway 62 to admit grease to the interior of the assembly 10 and is secured on the seal 56 by passing a rearward extension through an aperture in the radial flange 58a and staking over or expanding the end of the extension. The radial flanges 58 on either side of the assembly have sufficient length such that angled, molded, resilient lips 59 sealingly engage the inner circumference of the axial flanges 54 of inner sealing rings 50. This provides a positive seal which prevents the outflow of grease from the bearing assembly in normal bearing operation and the inflow of foreign particles which would otherwise cause faster wear or damage to the assembly. Yet, the lip 59 is sufficiently flexible to flex outwardly to allow the bearing to be purged of grease when sufficient grease pressure is applied during lubrication. The plastic or rubber material, such as black nitrile rubber, from which the sealing lip 59 is molded is also flexible enough to avoid any significant resistance to rotation of the outer race, and resilient enough to be long wearing and durable.

The final portion of the seal arrangement includes a rigid annular shield 70 formed from steel or the like. Shield 70 includes a radially extending, generally planar annular portion 72 and an axially inwardly extending, annular flange 74 at the outercircumference of portion 72. Axial flange 74 is spaced slightly inwardly from the axial portion of recess 16 so that no contact takes place during rotation of the outer race. Shield 70 also includes an aperture 76 through which the grease fitting 60 extends when the shield is mounted in cooperation with the other sealing members as well as a drain aperture 78 diametrically opposed to the position of the grease fitting aperture 76. Drainage aperture 78 allows the exit of water or excess grease from the assembly during operation.

As is best seen in FIGS. 1 and 4, the middle seal or shield 56 and outer rigid shield 70 on the right-hand portion of the assembly each include a central aperture so that the seal and shield can be telescoped over portion 44 of the hub into proper position on the assembly. Middle seal 56 includes aperture 64 having rectilinear or flat edges 66 and 68 diametrically opposed to one another. Rigid outer seal 70 includes aperture 80 including diametrically opposed flat or rectilinear edges 82 and 84. Hub portion 44 forming the support for middle and rigid shields 56 and 70 has a generally circular cross-sectional shape except for diametrically opposed flat or planar areas 48 and 49. Apertures 64 and 80 in middle shield 56 and shield 70 are slightly larger than the exterior dimension of hub portion 44 so that the same can be telescoped thereover as shown in FIGS. 2 and 3. Seal 56 and shield 70 on the left-hand portion of the assembly need not include the noncircular apertures unless the nonrotational apparatus is used on that side also.

In order to retain the middle seal and outer rigid shield 70 in their proper position tightly against the end surface of portions 32, 34 of inner race members 22, 24, a resilient, expandable split retaining ring 85 is provided and seated in a notch or groove 90 provided around a portion of the circumference of shield support portion 44 as shown in FIGS. 1 and 3–5. Split retaining ring 85 is preferably formed from spring steel such that it tends to return to its closed ring configuration and constantly urges itself into contact with the shield support 44. It is severed at 86, and is provided with expansion tool engaging apertures 87 so that the ring may be expanded and inserted in groove 90. Groove 90 is slightly deeper than the inner diameter of the split ring 85. The side surface of groove 90 which is farthest from the inner race member is angled away from the inner race member toward the opening of the groove at an angle of approximately 15° as shown in FIG. 5. When the split retaining ring 85 is inserted in the groove, the resilient closing force of the split ring and the engagement of the inner circumference of the split ring with the inclined wall 92 of the groove constantly urges shield 70 toward middle seal 56 and thus toward the end surface of inner race member 24. In order to accomplish this, the groove 90 is positioned slightly closer to the end of inner race member 24 on hub portion 44 than the combined thicknesses of middle seal 56 and rigid shield 70. A portion of the groove extends under the thickness of shield 70. Accordingly, as shown by the direction of the arrow in FIG. 5, split retaining ring 85 and inclined wall 92 of groove 90 serve to constantly bias the shield and sealing members tightly against the inner race while the cooperating flat or planar portions 48, 49, 60, 68, and 82, 84 prevent rotation of seal 56 including grease fitting 60 and shield 70 about the shield support member or hub portion 44. Grease fitting 60 is, therefore, always maintained in the same relationship to shield support 44 thereby enabling the use of automatic relubrication equipment when the bearing assembly is used in assembly lines or other conveyor systems incorporating such equipment.

As an alternative to split ring 85 and the angled or beveled groove 90, a convex, dish-shaped split retaining ring 95 may be used together with a straight-walled groove 96. As shown in FIGS. 6 and 7, the dish-shaped split retaining ring is severed at 97 such that it may be expanded and inserted in groove 96. Although convex in normal condition, the split ring 95 may be flexed to a planar position as shown in FIG. 8. Since the ring 95 is preferably formed from a resilient, memory-retaining, spring-like material such as spring steel, it naturally tends to return to its convex shape thereby constantly biasing shield 70 and middle seal 56 toward inner race member 24 as shown by the arrow in FIG. 8.

To assemble the bearing assembly, the right-hand row of ball bearings is loaded between raceway 30 and right-hand outer raceway 14. The right-hand inner sealing ring 50 is then press fitted in outer race 12 to hold the right-hand row of bearings in place. Similarly, the left-hand inner race member 22, inner sealing ring 50, and row of ball bearings are assembled. Hub 26 is then telescoped within race members 22, 24. Left-hand middle seal 56 and left-hand rigid shield member 70 are then telescoped over the end of portion 40 and flange 42 is turned radially outwardly to hold the inner race members and left-hand shield 70 and middle seal 56 in place.

The assembly is then turned over and right-hand middle seal 56 including grease fitting 60 and right-hand rigid shield 70 telescoped into place with flats 66, 68 and 82, 84 engaging planar areas 48, 49 on hub portion 44. Grease fitting 60 extends through aperture 76 in shield 70. Thereafter, either split ring retainer 85 or 95 is seated in the groove on hub portion 44 to complete the assembly.

In operation, should inspection or maintenance of the interior of the assembly be required, the split retaining ring merely need be removed from grooves 90 and 96 and shield 70 and middle seal 56 removed. The entire assembly can remain in place on its support shaft extending through bore 46 during such removal and inspection. When assembled, grease may be inserted through fitting 60 while the bearing remains assembled, the grease traveling through passageway 62 through the annular space between the end of radial flange 52a of right-hand inner sealing ring 50 and the inner race 24 and to the ball bearings. Excess grease can exit through drainage aperture 78 along with any water to which the assembly is subjected. The noncircular configuration of the mounting apertures on seal 56 and shield 70 and the cooperating portions on shield support portion 44 maintain the shield and seal from rotation relative to the hub thereby maintaining the position of the grease fitting in a predetermined location and enabling the use of automatic relubrication equipment.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows.

1. A bearing assembly comprising inner and outer annular bearing races spaced apart from one another, anti-friction bearing means interposed between said races for rotatably supporting one race with respect to the other; means for axially positioning said anti-friction bearing means; said assembly adapted to be supported on a support extending through said assembly; an extension extending laterally to one side of said inner race; shield means mounted on said extension for covering the opening between said races at the side of said assembly, said shield means including an aperture therethrough for receiving said extension; removable securing means for retaining said shield means including resilient retaining means for constantly maintaining engagement with said extension to hold said shield means on said extension and means allowing removal of said resilient retaining means and shield means without removing or disassembling said bearing assembly from any support for the assembly when the assembly is mounted thereon such that the shield means and retaining means are removable without disassembly of any other portion of the assembly or removal of the assembly from its support.

2. The bearing assembly of claim 1 wherein said retaining means include resilient, expandable ring means engaging said extension, said means allowing removal of said resilient retaining means and shield means including means for expanding and enlarging said ring means for separation from said extension.

3. The bearing assembly of claim 1 wherein said securing means include means for biasing said shield means toward said inner race.

4. The bearing assembly of claim 1 including means on said extension for preventing rotation of said shield means about said extension.

5. A bearing assembly comprising inner and outer annular bearing races spaced apart from one another, anti-friction bearing means interposed between said races for rotatably supporting one race with respect to the other; an extension extending laterally to one side of said inner race; shield means mounted on said extension for covering the opening between said races at the side of said assembly, said shield means including an aperture therethrough for receiving said extension; removable securing means for retaining said shield means including resilient retaining means for constantly maintaining engagement with said extension to hold said shield means on said extension such that the shield means and retaining means are removable without disassembly of any other portion of the assembly; said securing means including means for biasing said shield means toward said inner race; said extension including a groove extending about a portion of the circumference thereof; said retaining means including a resilient, expandable split retainer ring received on said extension in said groove for retaining said shield on said extension.

6. The bearing assembly of claim 5 wherein said means for biasing said shield means include a side wall of said groove which is inclined toward said inner race, said inclined wall being the wall farthest from said inner race whereby said ring means is urged toward said shield means to urge said shield means toward said races.

7. A bearing assembly comprising inner and outer annular bearing races spaced apart from one another, anti-friction bearing means interposed between said races for rotatably supporting one race with respect to the other; means for axially positioning said anti-friction bearing means; an extension extending laterally to one side of said inner race; shield means mounted on said extension for covering the opening between said races at the side of said assembly, said shield means including an aperture therethrough for receiving said extension; removable securing means for retaining said shield means including resilient retaining means for constantly maintaining engagement with said extension to hold said shield means on said extension such that the shield means and retaining means are removable without disassembly of any other portion of the assembly; said extension including a groove extending about a portion of the circumference thereof; said retaining means including a resilient, expandable split retainer ring received on said extension in said groove for retaining said shield on said extension.

8. A bearing assembly comprising inner and outer annular bearing races spaced apart from one another, anti-friction bearing means interposed between said races for rotatably supporting one race with respect to the other; an extension extending laterally to one side of said inner race; shield means mounted on said extension for covering the opening between said races at the side of said assembly, said shield means including an aperture therethrough for receiving said extension; removable securing means for retaining said shield means including resilient retaining means for constantly maintaining engagement with said extension to hold said shield means on said extension such that the shield means and retaining means are removable without disassembly of any other portion of the assembly; means on said extension for preventing rotation of said shield means about said extension; said shield means include an outer, rigid, annular shield mounted on said extension and extending to a position adjacent said outer race and flexible, resilient, annular seal means mounted on said extension intermediate said rigid shield and inner race and sealingly engaging said outer race for retaining grease within said bearing assembly and for preventing contaminants from entering said assembly, said seal means including an aperture receiving said extension therethrough and a grease fitting mounted thereon and extending through a second aperture in said rigid shield.

9. The bearing assembly of cliam 8 wherein said extension is a generally circular cylindrical shaft coaxial with said inner race; said means on said extension for preventing rotation of said shield means including a pair of planar areas, said apertures in said shield and seal means each including rectilinear edges corresponding to said planar areas of said otherwise circular, cylindrical shaft.

10. A bearing assembly comprising an annular inner race; an annular outer race spaced outwardly of said inner race; antifriction bearing means interposed between said races for rotatably supporting one of said races with respect to the other; shield means for covering the opening between said races at the side of assembly; shield support means extending laterally to one side of said inner race and providing a noncircular surface for mounting said shield means; and shield means having an aperture therethrough with a noncircular cross-sectional shape matching that of said shield support means for receiving said shield support means and greasing means for admitting grease to the interior of said assembly positioned in a predetermined position on said shield means, said noncircular surface and aperture preventing rotation of said shield means and maintaining said greasing means at the same position with respect to said shield support means; and securing means for holding said shield means on said shield support means.

11. The bearing assembly of claim 10 including means for supporting a grease fitting interior of said shield means such that it extends through a second aperture in said shield means.

12. The bearing assembly of claim 11 wherein said shield means includes an outer, rigid, annular shield mounted on said shield support means and extending to a position adjacent said outer race and flexible, resilient, annular seal means mounted on said shield support means intermediate said rigid shield and inner race and sealingly engaging said outer race for retaining grease within said bearing assembly and preventing contaminants from entering said assembly, said seal means including a noncircular aperture receiving said shield support means therethrough and said means for supporting said grease fitting.

13. The bearing assembly of claim 12 wherein said outer race includes an axial shoulder and an inner sealing ring fitted against said shoulder for rotation therewith, said inner sealing ring including a radial flange extending toward said inner race but ending a distance spaced from said inner race, and an axial flange; said seal means including a flexible, resilient annular lip engaging the inside surface of said inner sealing ring; said grease fitting being secured through an axial aperture in said seal means for introduction of grease through said shield, seal means and said space between said inner race and inner sealing ring to said antifriction bearing means between said races.

14. The bearing assembly of claim 13 wherein the portion of said seal means including said noncircular aperture receiving said shield support means is formed from a rigid material and axially offset from said annular lip, said lip being bonded to said rigid material.

15. The bearing assembly of claim 12 wherein said shield support means include a shaft coaxial with said inner race, said shaft having a circular cross section except for a pair of diametrically opposed planar areas, said apertures in said shield and seal means each including rectilinear edges corresponding to said planar areas of said shaft.

16. The bearing assembly of claim 15 wherein said shaft is a hollow hub, said inner race being received on the exterior thereof with a portion extending laterally to one side of said inner race.

17. The bearing assembly of claim 15 wherein said securing means include expandable ring means engageable with a groove in said shield support means adjacent said shield means to retain said shield means on said shield support means.

18. The bearing assembly of claim 10 wherein said shield support means include a shaft coaxial with said inner race, said shaft having a circular cross section except for a pair of diametrically opposed planar areas, said aperture in said shield means including rectilinear edges corresponding to said planar areas of said shaft.

19. The bearing assembly of claim 10 wherein said securing means include expandable ring means engageable with said shield support means adjacent said shield means to retain said shield means on said shield support means.

20. The bearing assembly of claim 19 wherein said shield support means includes a groove extending about at least a portion of the circumference thereof; said ring means being received on said shield support means in said groove.

21. The bearing assembly of claim 20 wherein the side of said groove farthest from said inner race is inclined toward said inner race whereby said ring means is urged toward said shield means to urge said shield means toward said races.

22. The bearing assembly of claim 10 wherein said securing means include means for biasing said shield means toward said inner race.

23. The bearing assembly of claim 10 wherein said shield support means is coaxial with said inner race.

24. The bearing assembly of claim 10 wherein said shield means is an annular, planar disc having a flange inturned toward said assembly at its outer circumference; said greasing means including an aperture through said disc.

* * * * *